United States Patent [19] [11] 4,257,277
Klobe [45] Mar. 24, 1981

[54] FLOW MEASURING DEVICE

[75] Inventor: Martin Klobe, Karlsruhe, Fed. Rep. of Germany

[73] Assignee: Siemens Aktiengesellschaft, Berlin and Munich, Fed. Rep. of Germany

[21] Appl. No.: 58,759

[22] Filed: Jul. 19, 1979

[30] Foreign Application Priority Data

Jul. 19, 1978 [DE] Fed. Rep. of Germany ....... 2831823

[51] Int. Cl.³ ............................................. G01F 1/32
[52] U.S. Cl. ................................................. 73/861.24
[58] Field of Search ................................... 73/194 VS

[56] References Cited

U.S. PATENT DOCUMENTS 3,972,232  8/1976  Miller et al. ........................... 73/194
4,052,895 10/1977  Herzl et al. ............................ 73/194

Primary Examiner—Herbert Goldstein
Attorney, Agent, or Firm—Kenyon & Kenyon

[57] ABSTRACT

Flow measuring device with a vortex-generating choke body which is arranged within a pipe section and consists of a prismatic forward part of trapezoidal cross-section and a parallelepiped-shaped extension projecting from the smaller surface of said prismatic part. In the interior of the prismatic part, two parallel pressure chambers are positioned transversely to the flow direction, which are connected via rows of openings or slots to the rear of the prismatic part, above and below the extension to form a pneumatic R-C combination. Pressure pickups for measuring the periodic pressure variations which are generated by the vortex separations and are proportional to the flow velocity, are arranged in the pressure chambers or in pressure-conducting connection therewith. By means of the R-C combination, the phase equality of the vortex separations over the width of the choke body is improved and the fading is reduced.

9 Claims, 4 Drawing Figures

FLOW MEASURING DEVICE

BACKGROUND OF THE INVENTION

1. Field of the Invention

This invention relates to a flow measuring device according to the principle of the Karman vortex path.

2. Description of the Prior Art

Devices for measuring flow are known. For example, U.S. Pat. No. 3,972,232 describes and claims such a device in body is constructed of a T-shaped structure having a relatively narrow prismatic forward part of trapezoidal cross section and a following parallelepiped-shaped part of relatively large thickness. The means for measuring the pressure variations are arranged in the form a piezoelectric pickups and are positioned in the parallelepiped-shaped part in such a manner that the pressure-sensitive surfaces are attached to the upper and lower side surfaces of the parallelepiped-shaped part and are parallel to the flow.

In the phase of the vortices along the choke body of the known device are considered, one of skill in the art would not expect the periodic motion along the choke body to be in phase. It is also known in the art that the viscosity of any flowing fluid does insure that only extremely small phase shifts occur between adjacent vortex elements through a take-along effect when a short choke body is employed. However, where a longer choke body is employed, appreciable phase shifts can occur. These phase shifts cause an equalization of fluid flow parallel to the axis of the choke body which can lead to disturbances of the periodic vortex separation, which, in turn, can lead to a fading out or even a temporary disappearance of the vortex effects. All of these factors result in erroneous measurements.

It is therefore an object of this invention to provide a flow measuring device which provides accurate measurements.

It is also an object of this invention to provide a flowing measuring device which has a choke body in which phase equality of the vortex separation over the entire length of the choke body is assured.

It is still another object of this invention to provide a flow measuring device in which the means for measuring the periodic pressure fluctuation can be positioned anywhere on the choke body without a loss of accuracy in measurements.

Still other objects and advantages of the present invention will be obvious and apparent to those of skill in the art from the specification and the appended claims.

SUMMARY OF THE INVENTION

These and other objects which are apparent to those of skill in the art from a consideration of the specification and appended claims are achieved by the flow measuring device of the present invention.

This invention provides a fluid flow measuring device of the type which functions according to the principle of the Karman vortex path which includes a vortex generating choke body which is adapted to be positioned within a pipe section. The choke body includes a prismatic part of trapezoidal cross-section. As is known such a prismatic part of the aforementioned structural configuration has parallel opposing surfaces of unequal length, and side surfaces of equal length joining the parallel opposing surfaces. The choke body also includes a parallel piped shaped extension which extends away from the smaller of the opposing parallel surfaces and essentially perpendicular thereto. The width of the parallelepiped-shaped extension is less than the width of the smaller surface of the prismatic part, and as a result, the choke body includes two parallel inside corners which extend the length of the choke body, and which are formed by the intersecting surfaces of the projecting parallelepiped-shaped extension and the smaller parallel surface of the prismatic part.

The advantages of the present fluid flow measuring device are achieved by two pressure chambers in the prismatic part which are positioned such that the longitudinal axis of each of the chamber extends the length of the prismatic part, transversely to fluid flow and parallel to each other, and parallel to the longitudinal axis of the opposing unequal surfaces of the prismatic part. The device of this invention also includes pressure pickups which are positioned inside said pressure chambers or in hydraulic connection therewith.

As a final essential component the improved flow measuring device of this invention includes two or more openings, at least one of which is in communication with each of the pressure chambers thereby providing pressure conducting communication between the chambers and the exterior of the prismatic part. The openings are positioned in the smaller surface of the prismatic part, along the inside corners defined by the intersecting surfaces of the parallelepiped-shaped extension and the smaller surface of the prismatic part.

In one preferred embodiment, the openings are designed as slots which extend along the corner above and below the parallelepiped-shaped extension and one of the slots is in pressure conducting communication with each of the pressure chambers along the entire length of the pressure chambers. The openings are preferably arranged along the inner edges of the inside corners, at which pronounced pressure variations occur due to the formation of vortices at the choke body edges.

The pressure chambers can be considered as hydraulic capacitors, in which no pressure gradient occurs along the longitudinal axis. These chambers function as hydraulic resistances and are in pressure conducting communication with the flowing medium by way of the openings or slots. In this manner the chambers are coupled with the periodic flow process and can measure flow by taking in and giving off flow medium particles. The pressure chambers and openings form respective hydraulic R-C sections. The reaction induced by the taking in and giving off of flow medium particles has the same phase as the vortices' processes along the choke body, and thereby, the phase equality of the vortex processes along the choke body axis are improved and the fading or disappearance of the vortex effects is prevented.

In the case of incompressible fluids, the aforementioned effect is improved if at least part of the wall separating the two chambers is designed as a wall movable perpendicularly to the separation plane. Such a wall can be constructed of a movable element such as a diaphragm. The reaction induced by the coupling of the pressure chambers with their openings, not only suppresses the fading of the vortex effects. But in addition, also has a favorable effect on the output signal, regardless of the type of measurement pickup used. This favorable effect on the output signal is independent of the position at which the pickup is attached to the choke body. This insures a wide choice of position at which pickups can be attached. For example, measurement pickups which are designed as pressure pickups be arranged on or in the outside surfaces of the choke body, except for the leading front surface. Alternatively, these pressure pickups can be positioned in the pressure chambers or, positioned outside of the choke body and connected to the pressure chambers via short lines. In one preferred embodiment, the pressure pickups are arranged on a removable partition between the two pressure chambers where they are protected from dirt and attack by the flow and can be replaced easily.

BRIEF DESCRIPTION OF THE DRAWINGS

The preferred embodiments of this invention, and the preferred uses thereof, will be described in greater detail in conjunction with the accompanying drawings. It should be appreciated that the means for carrying out the preferred embodiments, exemplified in the drawings are not limiting, but rather are illustrative and representative of many other embodiments which are within the spirit of this invention.

DESCRIPTION OF THE PREFERRED EMBODIMENTS

Figure 1:
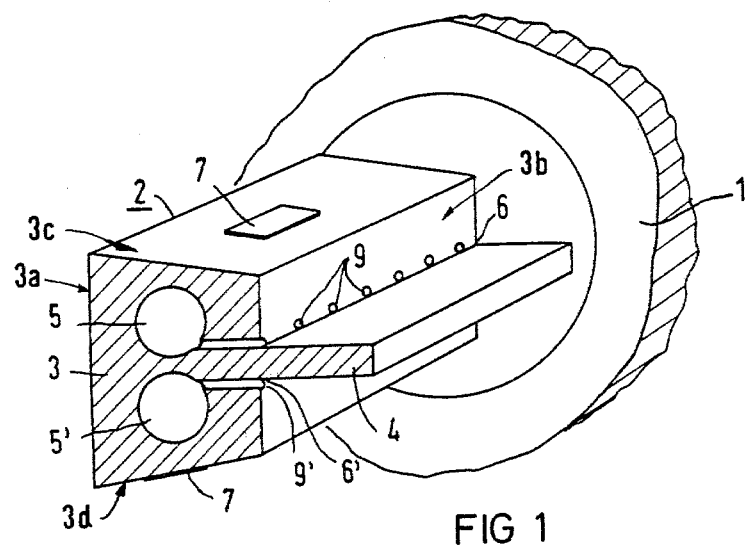
FIG. 1 is a perspective view of the back and side of an embodiment of this invention which is of unitary construction and that illustrates the trapezoidal cross-section of the prismatic part and the manner in which the flow measuring device of this invention can be positioned within a pipe section.

In FIG. 1, a perspective view of the side and back of an embodiment of this invention. The vortex generating choke body 2 of a flow measuring device of this is positioned within a pipe section 1, such that said body 2 extends transversely to the flow direction. FIG. 1 illustrates the manner in which the device of this invention is used. The choke body 2 consists of a forward prismatic part 3 of trapezoidal cross-section, which has a larger surface 3a which is in parallel alignment with a smaller surface 3b joined by inclined surfaces 3c and 3c'. The prismatic part 3 is adapted to be positioned such that the larger surface 3a is against the flow direction. Extending from the smaller surface 3b and essentially perpendicular thereto is a parallelepiped-shaped extension 4, which extends in the direction of flow when the device is positioned within pipe section 1. The point of juncture between the smaller surface 3b and the surfaces of the parallelepiped-shaped extension 4 define a pair of parallel inside corners 6 and 6', which extend the length of the smaller surface 3b and the surface of the parallelepiped-shaped extension 4. Along the inside corners 6 and 6' are positioned a row of identical openings and associated passages 9 and 9' which provide pressure conducting communication between the exterior of the choke body 2 and with pressure chambers 5 and 5'. Pressure chambers of 5 and 5' are positioned within the prismatic part 3 and the longitudinal axis of each of chambers 5 and 5' extends the length of the prismatic part 3. The combination of chambers 5 and 5', and openings and associated passages 9 and 9' form a hydraulic resistance-capacity combination.

In the embodiment of FIG. 1, the vortices generated by the periodic separation of the flow at the edges of the choke body 2 produce pressure variations. These pressure variations are converted into electrical signals by pressure pickups 7 arranged on the inclined outside surfaces 3c and 3c' of the prismatic part 3. Pressure pickups 7 are constructed such that the electrical signals are proportional to the pressure variations, and accordingly provide an accurate indication of the intensity of these variations. The pressure pickups are in hydraulic communication with the resistance-capacity combination which causes the phase equality of the vortex separation.

The pressure pickups can also be attached outside the pipe section 1 in a readily accessible manner, not shown here in detail, and can be connected to the pressure chambers 5, 5' via lines of low resistance. While not specifically depicted this embodiment is within the scope of the present invention.

Figure 2:
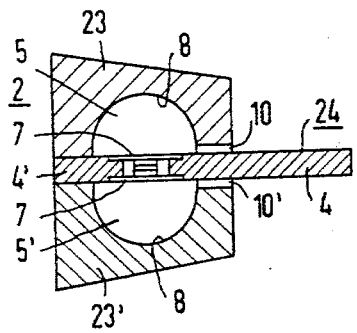
FIG. 2 is a vertical cross-sectional view of another embodiment of this invention which is composed of three shaped parts, and which include capacitive transducers.

The choke body 2 shown in FIG. 2 is composed of three shaped parts. These parts are the parallelepiped-shaped plate 24, the rear parts of which form the extension 4 of the choke body 2, and in the forward part 4' of which the pressure pickups 7 are positioned. In the embodiment of FIG. 2 the pressure pickups 7 are capacitive transducers of conventional design and construction. In this embodiment the pressure pickups are pressure-sensitive diaphragms which are positioned in the surfaces of the front part 4' and which constitute the movable electrodes of a capacitor or of a differential capacitor with fixed center electrodes. The prismatic part 3 is composed of two identical parts 23 and 23' which are provided with grooves 8 and 8' which cooperate with the surfaces of the slab 24 to form the pressure chambers 5 and 5' respectively, when the parts 23 and 23' are positioned symmetrically on the front part 4' of the slab 24. The rearward edges of the parts 23 and 23' do not rest on the slab-like plate 24. This forms slots 10 and 10' which extend the length of choke body 2, and which provide communication between the pressure chambers 5 and 5' and the exterior of choke body 2.

Figure 3:
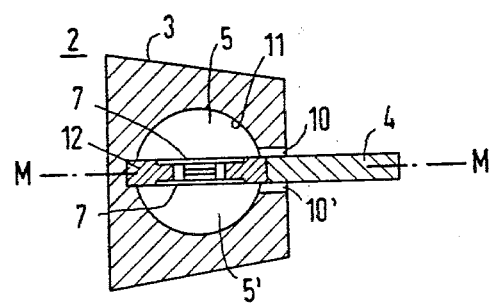
FIG. 3 is a vertical cross-sectional view of still another embodiment of this invention in which the chambers share a movable partition.

In another embodiment shown in FIG. 3, the prismatic part 3 includes a preferably cylindrical cavity 11. The axis of the cavity 11 lies in the central plane M—M of the choke body 2 and is subdivided into two equal pressure chambers 5 and 5' by a partition 12 extending in this center plane. The pressure chambers 5 and 5' are in communication with the flow medium via slots 10, 10' which are of a construction similar to that of the embodiment according to FIG. 2.

The partition 12 is also designed as a support for the pressure pickups 7 in a manner similar to that of the embodiment of FIG. 2. Partition 12 can be inserted into cavity 11 through the end face of the cavity 11.

Figure 4:
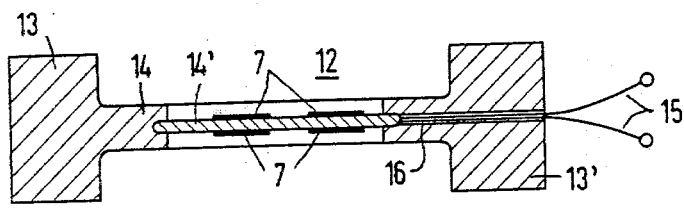
FIG. 4 is an enlarged fragmentary view of a partition.

In FIG. 4 is depicted a longitudinal cross section through a partition 12. The two end pieces 13 and 13' are cylindrical and have a diameter such that they can be inserted from the outside of the choke body 2 into the cylindrical cavity 11 with a tight fit. Between the cylindrical end pieces 13 and 13' there is the central part 14 of the partition 12, which has two surfaces which are parallel to the center plane and in which the pressure pickups 7 are positioned. In the embodiment of FIG. 4, the pickups can be piezoelectric transducers. The central part 14 can also be designed, as shown, in part as a movable wall 14' in the form of a diaphragm, which is of advantage especially for measuring the flow of incompressible liquids.

The signal lines 15 of the pressure pickups 7 which conduct the electrical signal are brought out via an axial hole 16 in the partition.

As can be readily appreciated, the embodiments according to FIGS. 3 and 4 allow for the construction of a system with choke bodies of different form and length, but with the same internal design. These choke bodies would include interchangeable supports for pressure pickups of different types and designs.

This invention has been described in terms of the specific embodiments set forth in detail in the drawings and by the generic description. Alternative modifications and embodiments will be apparent to those of skill in the flow measuring device art from a consideration of the generic description of the invention, and the specific embodiments described in this disclosure. Such modifications are within the spirit of the invention as disclosed and as claimed in the appended claims.

What is claimed is:

1. A flow measuring device according to the principle of the Karman vortex which comprises;
    a vortex generating choke body having a prismatic part of trapezoidal cross-section said prismatic part having a larger first surface and a smaller second surface in parallel alignment and said choke body having a parallelepiped-shaped extension projecting away from said smaller surface of said prismatic part and substantially perpendicular thereto such that the intersecting smaller surface and the surfaces of the parallelepiped extension define inside corners on both side of said parallelepiped extension;
    two pressure chambers positioned in said prismatic part, and extending the length thereof such that the longitudinal axis of one said chambers is parallel to the longitudinal axis of the other chamber and to the longitudinal axis of said first and second surfaces of said prismatic part;
    two or more openings at least one of which is positioned along each of said inside corners to provide pressure conducting communication between each of said chambers and the exterior of said choke body; and
    pressure pickups for measuring periodic pressure variations.

2. A device according to claim 1 wherein one of said pressure pickups is positioned inside of each of said pressure chambers.

3. A device according to claim 1 wherein one of said pressure pickups is in hydraulic communication with each of said chambers.

4. A device according to claim 1, wherein said openings are slots which extend along each of said inside corners above and below said extension and each of said slots is in pressure conducting communication with one said pressure chambers over its entire length.

5. A device according to claim 1, wherein said openings are formed by rows of identical holes which extend along the corners above and below said extension, each of said holes is in pressure conducting communication with one of said chambers.

6. A device according to claim 1, 4 or 5, wherein said prismatic part includes a cylindrical cavity, the axis of which lies in the central plane of said choke body, said cavity being divided into two equal halves by a partition, which forms two equal pressure chambers.

7. A device according to claim 6, wherein said partition or a portion thereof is movable perpendicularly to the partition plan.

8. A device according to claim 6, wherein said partition is adapted to be inserted into said cavity from an end face of said cavity, and adapted to be a support for said pressure pickups.

9. A device according to claim 7, wherein said partition is adapted to be inserted into said cavity from an end face of said cavity, and adapted to be a support for said pressure pickups.

* * * * *